United States Patent Office 2,732,446
Patented Jan. 24, 1956

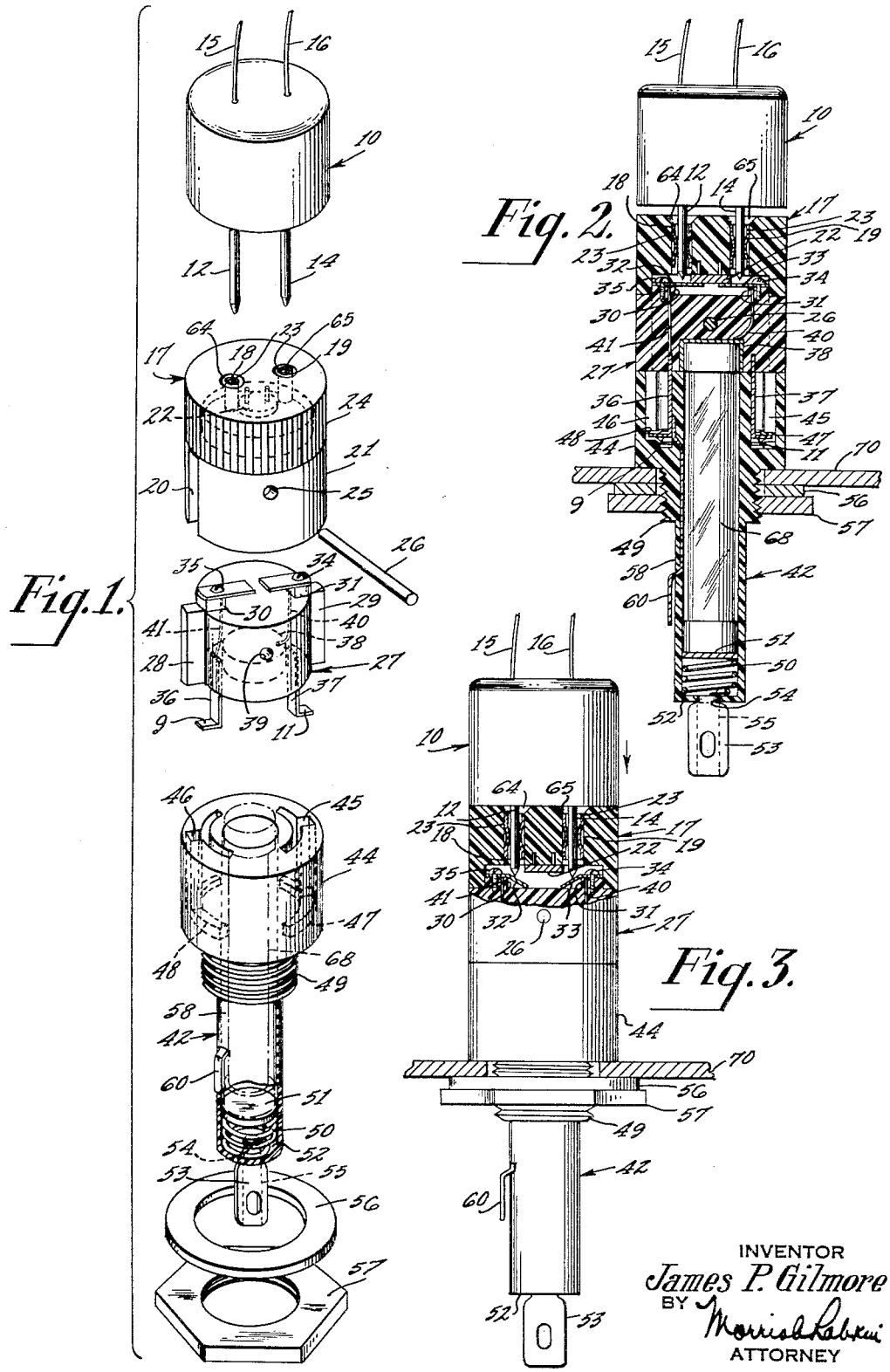

2,732,446

TEST PROBE ADAPTOR HEAD

James P. Gilmore, Haddonfield, N. J., assignor to Radio Corporation of America, a corporation of Delaware Application June 2, 1952, Serial No. 291,175

The terminal 15 years of the term of the patent to be granted has been disclaimed 4 Claims. (Cl. 200—51.1)

This invention relates to test equipment and, more particularly, to a test probe adaptor head suitable for use in conjunction with a fuse holder.

When a voltage is suddenly applied to a circuit, the current assumes a transient state for a brief interval, then gradually settles down to a steady-state condition which is maintained until the voltage is interrupted or changed. In many complex electrical distribution systems, each portion of equipment to be tested is brought out to a separate front panel receptacle or jack. When it is desired to connect measuring instruments to the equipment it is often necessary to temporarily open the circuit to be measured while inserting the measuring instrument. Circuit unbalance or other disturbances are caused by inserting an external measuring meter into the circuit. The fuses, which normally are in circuit with the equipment must be momentarily disconected while the test instrument is placed in circuit therewith. In such case, circuit continuity, from the source of operating potential through the fuse to the equipment and return to the potential source no longer exists. The equipment, thus is unprotected from abrupt voltage changes and possible current overloads. Distribution systems of the type abovementioned involve the use of extremely small working areas and highly compact grouping of circuit components. Rapid, accurate and efficient circuit testing is therefore rendered difficult.

In accordance with the present invention, fuse holders of a known type are modified in a novel manner to provide for connection of an ammeter or a voltmeter into the circuits of fuse protected apparatus. In this way, the highly compact grouping of circuits is maintained and the fuse holders are themselves employed as instrument connection jacks.

It is an object of the present invention, therefore, to provide a unitary test probe adaptor head and miniature fuse holder for ready connection to either an ammeter or a voltmeter.

Another object of this invention is to provide means for maintaining a fuse in circuit with equipment under test while allowing a test probe device to be inserted into and removed from the adaptor head.

A further object of the invention is to provide means for circuit testing of complex electrical equipment which will avoid circuit unbalance caused by connection of a test probe to the circuit.

A modified miniature fuse holder and adaptor head, in accordance with the present invention, may for example, comprise, a body and a cap associated together as a unitary structure. The body and cap may be injection-molded of a thermosetting synthetic resin. The cap and body are adapted to be received into a modified plug-like fixture fabricated in the shape of a hollow cylindrical body portion forming a container for a conventional fuse. Test panel fastening means in the form of external threads surround the middle portion of the fixture. The enlarged upper end of the fixture containing conductive contacts is adapted to engage the cap by bayonet connection means or the like. The bottom portion of the cylindrical body contains a spring having a contact element at one end and a solder lug on the opposite end. The cylindrical body is adapted to receive a fuse which is positioned by pressure of the spring. A strap of conductive material is formed at one end to serve as a contact to be engaged by a contact on the body associated with the cap. The strap extends interiorly of the cylindrical body to protrude therethrough and serve as a soldering lug. The upper and lower solder lugs are the connecting means for connecting the fuse to the circuit to be protected.

The novel features that are considered characteristic of the invention are set forth with particularity in the appended claims. The invention itself, however, both as to its organization and method of operation, as well as additional objects and advantages thereof, will be best understood from the following description when read in connection with the accompanying drawing, in which:

Fig. 1 is an exploded view of a test probe adaptor head and fuse holder constructed in accordance with the principles of the invention;

Fig. 2 is a view partially in section of the structure of Fig. 1; and

Fig. 3 is an elevational view similar to Fig. 2 showing a different position of the cooperating parts.

Referring more in detail to the drawing, the device embodying the present invention includes four main parts shown as being separated in Fig. 1 for convenience of illustration. The test probe plug 10 may be any conventional plug for connecting a measuring instrument such as an ammeter or a voltmeter (not shown) to the adaptor head.

The test plug 10 includes two contact prongs 12 and 14 and two leads 15 and 16 each connected to a prong. The leads afford convenient means for connection to the measuring instrument. Two passages or holes 18 and 19 in the cap 17 receive the contact prongs which are frictionally engaged by yielding constricted sleeves 23. Two transverse notches or cut-outs 20 and 21 extend vertically along the outer circumference of the cap 17. The holes 18 and 19 of the cap 17 are positioned and accurately centered therein with respect to a circular conductive contact or disc 22 so that it is flush with the inner ends of the holes 18 and 19 for a purpose to be explained hereinafter. The disc 22 is molded into the cap 17 and securely affixed thereto. A knurled edge 24 provides a means for gripping and rotating the cap 17. A drilled hole extends transversely through the cap 17 to receive a pin 26 of insulating material which secures a cylindrical insert 27 within the cap 17.

The plastic cylinder 27 is molded and shaped so that it can be inserted under pressure and heat sealed into cap 17, by means of two integral plastic keys 28 and 29 which cooperate with the cut-outs 20 and 21. The pin 26 received in holes 25 and a hole 39 may also be heat sealed. The pin assists in aligning the parts. Two solid vertically projecting blocks or contact support members 30 and 31 are integrally molded to one end of the member 27. Two conductive spring contact elements 32 and 33 are rigidly secured to the supports 30 and 31 by means of screws 34 and 35. The supports 30 and 31 may be integral with the plastic cylinder 27. The elements 32 and 33 are adjustably positioned so as to make continuous electrical contact with the disc 22 when contacts 32 and 33 are horizontally extended toward each other as shown. A first conductive strip or leg 36 is molded into the cylinder 27 adjacent to and extending below the key 28. A strip or leg 37 is molded into the cylinder 27, adjacent to and extending below the key 29 to serve as a mechanical abutment. The lower end of the strip 36 has an outwardly extending right angle bend in the end portion thereof. The member 37 has a similar right angle bend in the lower extremity thereof. A contact socket 38 of conductive material is shaped in substantially the form of a fuse cap and is molded securely into a hollow depression or seat in the cylinder 27. The contact socket 38 is conductively connected to the spring contact 33 by means of a lead 40. Leg member 36 is conductively connected to the spring contact 32 through a lead 41.

The miniature fuse holder body 42 which cooperates with the cap 17 is molded from plastic in the form of a hollow cylindrical plug-like fixture having an enlarged upper or cap end 44. Two separate slots 45 and 46 are molded into the body 42 and run the length of the enlarged cap end 44. Each slot has a radial portion and an arcuate portion. Two arcuate jaw contacts 47 and 48 are seated within the bottom of the arcuate portions of the slots 45 and 46, respectively. Each contact is channel-shaped with a portion of the top channel wall omitted at the location of the radial portion of the corresponding seat to admit the contact 9 or 11 of the leg member 36 or 37 as the case may be. The contact 48 is the engaging element for the contact 9 and is situated at the base of slot 46. The contact 47, situated at the base of slot 45, is the engaging element for contact 11. The body member 42 is provided with external threads 49 adjacent the cap end 44.

As shown in Fig. 1 the lower internal end of the hollow body 42 retains a spring 50 which is seated against a flange 52. The upper or fuse end of the spring 50 has attached thereto a flat seat or contact 51 which is connected by way of the spring 50 to a solder lug 53. The assembly comprising the contact 51, the spring 50 and the lug 53 is inserted into the hollow cylindrical body 42 and pushed to the bottom end thereof so that the lug 53 extends through a hole 54 in the flange 52. The lug 53, before insertion through hole 54 is in the shape of a narrow conductive extension as shown by the dotted outline 55 of Fig. 1. After the lug 53 is pushed through the hole 54, any suitable device (not shown) distorts the lug 53 to its flat configuration so that the width of the lug 53 exceeds the diameter of the hole 54. The lug thus retains the parts 50 and 51 within body 42. A washer 56 and a nut 57 serve to fasten the body 42 to a plate member such, for example, as a cabinet wall 70. The jaws 47 and 48 serve to maintain engagement between the body 27 and the cap 44 by means of the contacts 9 and 11. The contact 11 does not serve as an electrical connector but performs only a mechanical receiving function. The bevels 64 and 65 of cap 17 provide guide means to facilitate the insertion of the test plug 10.

The disc 22 is secured during the molding process to the cap 17 by means of the two expansion pins 66 and 67 (Fig. 2). A continuous internal circuit as shown in Fig. 2 is provided from the circuit under test (not shown) by way of the lug 53, the fuse 68, through the lead 40 to contact 33 and disc 22; back from disc 22 through the contact 32 by way of the lead 41, the leg 36, the contact jaw 48 and the strip 58 to the lug 60.

Assuming that the cap 17 and the cylinder 27 have been assembled into one unitary structure as explained before, the unit is now ready for insertion into and engagement with the fuse holder 42. The legs 36 and 37 which now extend from the bottom of the unitary structure are brought into alignment with their matching slots 46 and 45 respectively in the enlarged end 44 of fuse holder 42. The unit is then pushed into the enlarged end 44 until the legs 36 and 37 strike the bottom of the slots 46 and 45. A slight turn of the assembly either to the right or left will cause the jaws 48 and 47 to engage the legs 36 and 37 so that a mechanical as well as an electrical connection is thereby made.

A fuse 68 is shown in Fig. 2 as it appears with the fuse holder device of the invention in use.

As shown in Fig. 3 when the pins 12 and 14 of the plug 10 are fully inserted into the holes 18 and 19, the electrical and mechanical connections between contact 32 and 33 by way of the disc 22 are broken, and the pins 12 and 14 make electrical connection to contacts 32 and 33, respectively. The latter connections thus retain the fuse 68 in the circuit by way of the various connections beforementioned. This provides a convenient connection for a series connected measuring instrument such as an ammeter. With the pins 12 and 14 fully inserted, the contacts 32 and 33 are physically bent away from the disc 22 so that the fuse 68 is retained in the circuit under test.

Referring to Fig. 2 it will be seen by one skilled in the art that the pins 12 and 14 can be inserted to the degree shown. A convenient connection for a shunt connected instrument such as a voltmeter is readily provided by connecting one terminal of the instrument to either of the leads 15 or 16. The remaining instrument terminal is connected to a circuit reference point such, for example, as ground.

As will readily be apparent, the operation of the invention is simple, automatic and efficient. Assuming that the plug 10 has been electrically connected for either current or voltage measurements, either an ammeter or a voltmeter probe device can be used.

What is claimed is:

1. A test probe adaptor to be used with a fuse holder of the type comprising a hollow cylindrical member of insulating material adapted to receive a fuse and said adaptor therein, a plug having contact prongs extending externally thereof, a first pair of conductive connections oppositely disposed in one end of said adaptor, a second pair of conductive connections disposed in the opposite end of said adaptor, a cap for said adaptor and a cylinder contained within said cap, said cap having oppositely disposed passages therein to receive said prongs, a pair of flexible contacts and a pair of depending oppositely positioned elements for detachably securing said adaptor disposed in said cylinder, said flexible contacts and said depending elements adapted to be interconnected, said first pair of conductive connections and said second pair of conductive connections being placed in an electrical contact with each other upon insertion of said prongs into said adaptor, a further conductive element integrally mounted in said cap and disposed to normally electrically interconnect said flexible contacts, said second pair of connections being disconnected from said further conductive element upon introduction of said prongs in said passages.

2. A test probe adaptor to be used with a fuse holder of the type comprising a hollow plastic cylindrical body adapted to receive a fuse, a plug having contact prongs extending externally thereof, one end of said body having means for connection to a test circuit, the opposite end thereof having means for connection to said adaptor, said adaptor comprising a cap including a first pair of normally oppositely disposed flexible contacts, a second pair of oppositely disposed conductive connections, a pair of parallel openings in said cap adapted to receive said prongs, a conductive disc integrally mounted in said cap and positioned to engage said first pair of contacts and to be flush with said contacts when said contacts are normally oppositely disposed, means whereby said prongs bend said flexible contacts so as to disengage said disc from said contacts, and said prongs of said plug become conductive means for completing a circuit from said first connections to said second connections.

3. A test probe adaptor to be used with a fuse holder of the type comprising a hollow cylindrical member of insulating material adapted to receive a fuse therein, a first pair of conductive connections oppositely disposed in said member, said adaptor comprising a cap and an adaptor head, said cap receiving said head and having oppositely disposed passages therein, a second pair of conductive connections disposed in said head, said passages being adapted to receive the prongs of a plug, said second pair of connections being in electrical contact with said first pair of connections upon association of said adaptor with said fuse holder, a conductive element comprising a disc integrally mounted in said cap and positioned to complete a circuit between said second pair of conductive connections.

4. A test probe adaptor adapted to be used with a test plug having probes and a fuse holder of the type comprising a hollow insulating cylindrical body member adapted to receive a fuse, one end of said body member having means for connection to an electrical circuit, the opposite end thereof having a pair of oppositely disposed conductive connections for connection to said adaptor; said adaptor comprising a cap, a pair of oppositely disposed flexible contacts in said cap, a pair of parallel channels in said cap for insertion of the probes of a test plug, a pair of conductive elements integrally mounted in said cap for connection to said oppositely disposed conductive connections in said body member, means for connecting said conductive elements to said contacts, a conductive disc fixedly mounted in said cap and disposed so as to engage said oppositely disposed flexible contacts, the probes of a test plug engaging said flexible contacts upon insertion of said plug into said cap to bend said contacts out of engagement with said disc whereby the electrical circuit is established through said probes while said fuse is retained in said circuit at all times.

References Cited in the file of this patent

UNITED STATES PATENTS

| | | |
|---|---|---|
| 402,829 | Hopkins | May 7, 1889 |
| 413,813 | Root | Oct. 29, 1889 |
| 1,487,699 | Albrecht | Mar. 25, 1924 |
| 1,554,499 | Healey et al. | Sept. 22, 1925 |
| 1,793,846 | Durbin | Feb. 24, 1931 |
| 1,892,567 | Craddock | Dec. 27, 1932 |
| 2,089,165 | Oliver | Aug. 3, 1937 |
| 2,192,826 | Cole | Mar. 5, 1940 |
| 2,197,426 | Del Camp | Apr. 16, 1940 |

FOREIGN PATENTS

| | | |
|---|---|---|
| 349,742 | Great Britain | June 4, 1931 |
| 691,333 | Germany | May 23, 1940 |